(12) United States Patent
Polz et al.

(10) Patent No.: US 6,588,526 B1
(45) Date of Patent: Jul. 8, 2003

(54) FRONT HOOD ASSEMBLY

(75) Inventors: Andreas Polz, Gelsenkirchen (DE); Peter Schlegel, Wuppertal (DE); Jörg Schneppenheim, Germering (DE)

(73) Assignee: Edsca AG, Remscheid (DE)

( * ) Notice: Subject to any disclaimer, the term of this patent is extended or adjusted under 35 U.S.C. 154(b) by 0 days.

(21) Appl. No.: 09/979,233

(22) PCT Filed: May 17, 2000

(86) PCT No.: PCT/DE00/01602
§ 371 (c)(1),
(2), (4) Date: Feb. 22, 2002

(87) PCT Pub. No.: WO00/69708
PCT Pub. Date: Nov. 23, 2000

(30) Foreign Application Priority Data

May 17, 1999 (DE) .......................... 199 22 455

(51) Int. Cl.[7] .............................. B60K 28/10
(52) U.S. Cl. ..................... 180/69.21; 180/274
(58) Field of Search ............... 180/69.2, 69.21, 180/69.22, 69.23, 69.24, 271, 274; 296/189, 194, 203.2

(56) References Cited

U.S. PATENT DOCUMENTS

| | | | | |
|---|---|---|---|---|
| 1,344,095 A | * | 6/1920 | Skala ...................... | 180/69.21 |
| 2,800,324 A | * | 7/1957 | Coe ......................... | 180/69.21 |
| 4,249,632 A | * | 2/1981 | Lucchini et al. ........... | 180/274 |
| 4,359,119 A | * | 11/1982 | Kammerman .............. | 180/69.21 |
| 5,263,546 A | * | 11/1993 | Cady et al. ................ | 180/69.21 |
| 5,385,212 A | * | 1/1995 | Cady et al. ................ | 180/69.21 |
| 5,749,425 A | * | 5/1998 | Cudden ..................... | 180/69.2 |
| 6,237,992 B1 | * | 5/2001 | Howard .................... | 296/194 |

FOREIGN PATENT DOCUMENTS

| | | |
|---|---|---|
| DE | 2711338 | 9/1978 |
| DE | 2711339 | 9/1978 |
| DE | 2737876 | 3/1979 |
| DE | 2841315 | 4/1980 |
| DE | 2922893 | 12/1980 |
| DE | 19721565 | 12/1997 |
| DE | 19706878 | 8/1998 |
| DE | 19712961 | 10/1998 |
| DE | 19948460 | * 4/2001 |
| DE | 19948881 | * 4/2001 |
| DE | 19948459 | * 5/2001 |
| EP | 0509690 | 10/1992 |
| EP | 992419 | * 4/2000 |
| EP | 1104726 | * 6/2001 |
| JP | 59026370 | 2/1984 |
| JP | 404081369 | * 3/1992 |
| JP | 04212677 | 8/1992 |
| JP | 9315266 | * 12/1997 |
| JP | 2000-108842 | * 4/2000 |

OTHER PUBLICATIONS

* cited by examiner

Primary Examiner—Brian L. Johnson
(74) Attorney, Agent, or Firm—Davidson, Davidson & Kappel, LLC (57) ABSTRACT

A vehicle front hood hinge mechanism uses at least one spring-loaded hinge for securing the front hood to the body of the automobile, which front hood is deflected upon impact with a pedestrian against a vertical spring force. One linkage of the hinge is coupled to the automobile body by a sliding linkage arm that is displaced horizontally against a spring bias.

14 Claims, 6 Drawing Sheets

FRONT HOOD ASSEMBLY

BACKGROUND OF THE INVENTION

The invention relates to a front-hood arrangement wherein a front hood of a vehicle is coupled to the frame of the vehicle via at least one hinge, which front hood can also be closed by means of at least one hood lock, the at least one hinge being of resilient design, and a stressing means for providing a vertical resistance, which can be overcome, to a force acting on the front hood being provided.

By now, numerous safety devices, such as airbags and the like, for passengers in automobiles are known from practical applications. By contrast, protective measures for pedestrians who are hit by the front end of a passenger automobile have to date scarcely been proposed or implemented in practice. Accidents involving pedestrians which take place at speeds of up to 60 km/h have proven particularly problematical, since, if the pedestrian is hit head-on, his head often strikes the engine hood of the passenger automobile, and the pedestrian dies from his injuries. The seriousness of the injury results from the fact that although the front or engine hood, which is usually formed from thin metal sheet, would tend to bend, it then strikes parts which are arranged beneath the engine hood and in practice cannot be deformed or can only be deformed with difficulty, such as the engine block, the suspension-leg carrier, the air filter, the valve cover or the frame side and cross members of the vehicle. It would be desirable if the consequences of an impact in particular of the head of a pedestrian could be made less severe. By contrast, at speeds of over 60 km/h, the pedestrian, after he has been hit, is thrown over the vehicle.

German Patent document DE-C-29 22 893 proposes that the engine hood and the wing, in the region of the joint formed between these two parts, be supported, by means of energy-absorbing U-sections which run along the two parts, on body components, and in the event of a collision these U-sections convert the impact into deformation energy. A first drawback of this arrangement is that considerable forces have to act on the sections in order to bend them. Moreover, these otherwise useless U-sections are expensive to procure and difficult to fit.

German Patent document DE-A-27 37 876 describes an impact protection device which uses a prestressed pivot flap to displace a mesh-like absorption element out of an at-rest position, in which the mesh rests substantially on the front hood, into an absorbing position, which runs substantially in front of the windshield of the automobile. This device is used more to protect the windshield than the pedestrian from an excessively hard impact on the front hood. Moreover, any contact with the sensor which triggers the pivoting movement and is integrated in the front bumper can cause the mesh to be triggered, with the result that a whole range of situations arise in which the mesh completely blinds the driver.

German Patent document DE-A-28 41 315 describes a safety device in which, in reaction to a signal from a sensor arranged at the front of a vehicle, to detect a collision with a pedestrian, the front hood is displaced out of an at-rest position into an impact position, which is raised with respect to the at-rest position, by a piston-cylinder unit, the displacement being effected by an energy store. During the raising operation, the front hood is pivoted about a horizontal pivot pin which is arranged at the front of the vehicle.

German Patent document DE-A-197 10 417 describes an arrangement for lifting the front hood in which pivoting about a horizontal pivot pin arranged at the front of the vehicle is triggered by the same pneumatic spring which also assists with the raising of the front hood which is coupled to the other end.

German Patent document DE-A-197 21 565 describes a safety device on motor vehicles for raising the front hood in which the raising of the front hood takes place in a speed-dependent manner by means of a mechanism which is integral with the hood lock. For this purpose, either the unlocking of the lock which is acted on by a compression spring, which for safety reasons is normally triggered from the driver's compartment, is triggered by a sensor which is triggered by an impact, or alternatively, particularly at relatively high speeds, a piston-cylinder unit which is integrated in the catch bolt of the hood lock is expanded by a propelling charge. A first drawback of this arrangement is that the force required to close the front hood must not exceed a defined threshold, in order to allow the driver to close the front hood with ease. Since the forces which strike in the event of an accident involving a person are considerable, the front hood is pressed down rapidly, and the known injuries occur, in particular in the region of the head. Providing a propelling charge in order to expand a piston-cylinder unit also causes problems, since the service life of this charge, in particular in a relatively unprotected arrangement, is limited, and the charge is difficult to exchange. Moreover, there is a risk of the compression spring and the piston-cylinder unit being triggered simultaneously, with the result that the opening of the front hood would become so great that the airstream would bring the hood into contact with the windshield, thus preventing the driver from being able to see.

German Patent document DE-A-27 11 338 describes a device for damping the impact of a pedestrian, in which an airbag is arranged in the region of the cowl, the filling of which airbag is triggered by a sensor signal. In this case, the airbag may be arranged in such a way that, at the same time, it raises a part of the front hood; to do this it overcomes a spring force which preloads two links, which are connected to one another via a rotation point and one of which is arranged rotatably on the front hood and the other of which is arranged rotatably on a fixed part of the motor vehicle, into an angled position. Furthermore, it is proposed to arrange resilient profiled bodies in strip form in the manner of a seal between hood and side parts, in order in this way to provide further protection in the event of an impact.

German Patent document DE-A-27 11 339 describes a front hood which is coupled at the front side and in which the coupling is designed to be resilient, in such a manner that it allows a horizontal displacement of the front hood through the impact of a pedestrian, the front hood which is displaced toward the rear being connected at the rear side to one end of a rigid locking element, the other end of which, in the event of displacement of the front hood, is displaced upward and toward the rear in a guide curve in such a manner that the front hood executes an upward movement. This lifting only takes place if horizontal displacement of the front hood has actually occurred, which is not always the case, for example, in the event of impacts of children.

European Patent document EP-A-0 509 690 describes a front hood, which at its front side is coupled to the vehicle structure in such a manner that, as a result of an impact, the front hood is displaced toward the rear, the closure or pivot means arranged at the rear side, as a result of a movement of the front hood toward the rear, triggering an upward pivoting movement of the front hood, so that the deformation travel of the hood is increased in the event of the impact of a pedestrian. The pivoting movement is guided, for example, by a four-joint hinge, which is otherwise used to pivot the front hood when it is desired to release access to the engine and other parts. In this case too, the front hood is only lifted in the event of a very substantial displacement of the front hood, while a weak impact does not displace the front hood toward the rear and therefore upward.

German Patent document DE-A-197 12 961 describes the arrangement of a front hood on a vehicle in which a hinge is arranged on a hinge mount, which hinge, in the event of a collision with a pedestrian, is pivoted upward in order to raise the front hood. A problem of this arrangement is that the hood lock for the front hood defines a pivot axis which does not allow optional displacement of the hinge mount, and consequently the hinge mount described is, for example, blocked.

Overall, as yet no solution has been proposed which proposes an inexpensive arrangement, which can be readily restored after use and which is so well developed that it could be used in mass-produced vehicles.

SUMMARY OF THE INVENTION

It is the object of the invention to propose a front-hood arrangement that supplies pedestrian protection that can be achieved inexpensively and on an industrial scale.

This object is achieved, for the front-hood arrangement described at the beginning, according to the invention, in that a link that connects a joint of the hinge to the frame is arranged displaceably.

The invention provides a resilient hinge which, to prevent an impact of a pedestrian on the front hood, is displaced in order to convert the impact energy into kinetic energy, the hinge to which the front hood is coupled having stressing means which provide a prestress which is substantially oppositely directed to the assumed direction of impact or at least the vertical component thereof, the impact energy compressing the stressing means or causing them to be displaced counter to a resistance, so that the work required to achieve this reduces the impact energy. For this purpose, the link which is coupled to the joint and connects the front hood to the frame of the vehicle is expediently arranged to be axially displaceable in the direction of travel inside a horizontal bearing, in order to ensure that the displacement of the front hood which is caused by an impact and involves the compression of the stressing means takes place in a substantially constant radius about the pivot axis defined by the hood lock. Expediently, the link in the sliding bearing is prestressed toward its high at-rest position, so that, without the load caused by a pedestrian impact, the front hood can be pivoted freely about the joint after the hood lock has been released, in order to provide access to the engine compartment. On account of the displaceable arrangement of the link in a horizontal bearing, the hinge functions even when the front hood is displaced toward the rear on account of the impact.

The stressing means are preferably constructions which are formed in the manner of compression spring arrangements and which, in a suitable way, during the impact store their stressed energy state at least temporarily, in order to prevent the pedestrian from being thrown back; this may also be achieved by locking the link. As a result, it is advantageously possible for the stressing means, after they have been released, to be moved back into the ready-for-use position without extensive refit work being required to achieve this. This is particularly advantageous if an otherwise undamaged front hood is to be returned to its ready-to-operate position, for example as a result of it being triggered incorrectly.

The stressing means advantageously allow continuously or virtually continuously graduated tensioning and therefore enable different levels of energy to be converted in response to different mass and impact velocities of pedestrians. In this case, it is particularly advantageous if the lowering of the front hood which is associated with the stressing of the stressing means, as a result of a minimum load being exceeded, initially allows considerable lowering in the event of a medium load, and if the load is greater than this merely entails a maximum lowering by the same amount again. As a result, it is. possible in particular to actively combat injury to children in the front region of the front hood. The threshold which needs to be overcome is greater than the force produced by the mass of the front hood itself, which is, for example, 40 kg, the weight force being distributed over two hinges.

According to a first refinement of the stressing means, these means are a mechanical compression spring which is fixed in a vertical recess in the frame and which has a linear or progressive spring characteristic curve, it also being possible for a one-way stressing element, such as a compressible foam. or the like, to be provided instead of the mechanical spring. It is also possible to provide for plastic deformation to a resistance over the vertical displacement movement of the joint.

According to a further preferred refinement of the stressing means, these means comprise a rod which is coupled to the joint, projects substantially vertically downward and over its extent is designed with bulges and contraptions, thereby defining latching positions in the intervals between the bulges. This rod can also be referred to as a latch bar. A spring system, which engages around the latch bar and in which one end of the springs is supported in the abutment and the other end of the spring is formed by a ball member facilitating friction and coming into contact with the latch bar, is provided in a horizontal bearing from at least two sides and preferably in a radially encompassing fashion. The prestressing of the springs requires a certain minimum force to restore the springs on account of the compressive load of the latch bar. This force can be set either by suitably selecting the spring characteristics or by shifting the abutments, if they are adjustable, or finally by means of the dimensioning of the radial bulges of the latch bar. For example, it is possible to provide the first two latching positions for converting a relatively small amount of energy into stressing energy of the springs, while the next two latching positions require a medium energy level, and the final two latching positions require a high energy level. This ensures. that, in the event of the impact of a child in an unfavorable lever relationship with respect to the stressing means, the front hood is nevertheless restored. or displaced downward by a significant proportion of the maximum displacement, for example by a third, or at high speeds perhaps by two thirds. If an inadvertent load is applied to the latch bar, leading to stressing of the stressing means, it is possible to use the same force to pull the bar back out of the spring, but there is no springback effect, which would lead to a pedestrian rebounding from the front hood. The total stressing travel which can be set is, for example, 100 mm and preferably not less than 70 mm in the region of the stressing means; more uniform lifting of the front hood to provide protection in the event of an impact of a pedestrian can be ensured by suitable lifting of the front hood in the region of the hood lock.

It should be taken into account that, for visual reasons and for reasons of the noise which is produced, it is generally undesirable for the raised front hood to form a gap, and consequently the fenders should be brought to bear accordingly against the raised front hood without, however, adjusting the displacement travel of the front hood.

The front-hood arrangement according to the invention is expediently used with a front hood in which the hood lock is provided at the front, as seen in the direction of travel, and the hinges are provided at the rear, as seen in the direction of travel, although it is also possible for this arrangement to be reversed.

According to a particularly preferred feature of the invention, the hinge is designed to be resilient in the ready-to-drive state, so that the impact of a pedestrian can be alleviated at any time. Consequently, it is not necessary to maintain a complex, difficult-to-manage impact sensor system and drive means for a propelling charge, which generally do not operate in the event, for example, of vehicles rolling away. Furthermore, the vehicle is also ready to drive again after an impact and is in the same state as that which is licensed for use in road traffic.

Further advantages and features of the invention will emerge from the following description and from the dependent claims.

BRIEF DESCRIPTION OF THE DRAWINGS

The invention is explained in more detail below on the basis of two exemplary embodiments and with reference to the appended drawings.

DETAILED DESCRIPTION OF THE INVENTION

Figure 1:
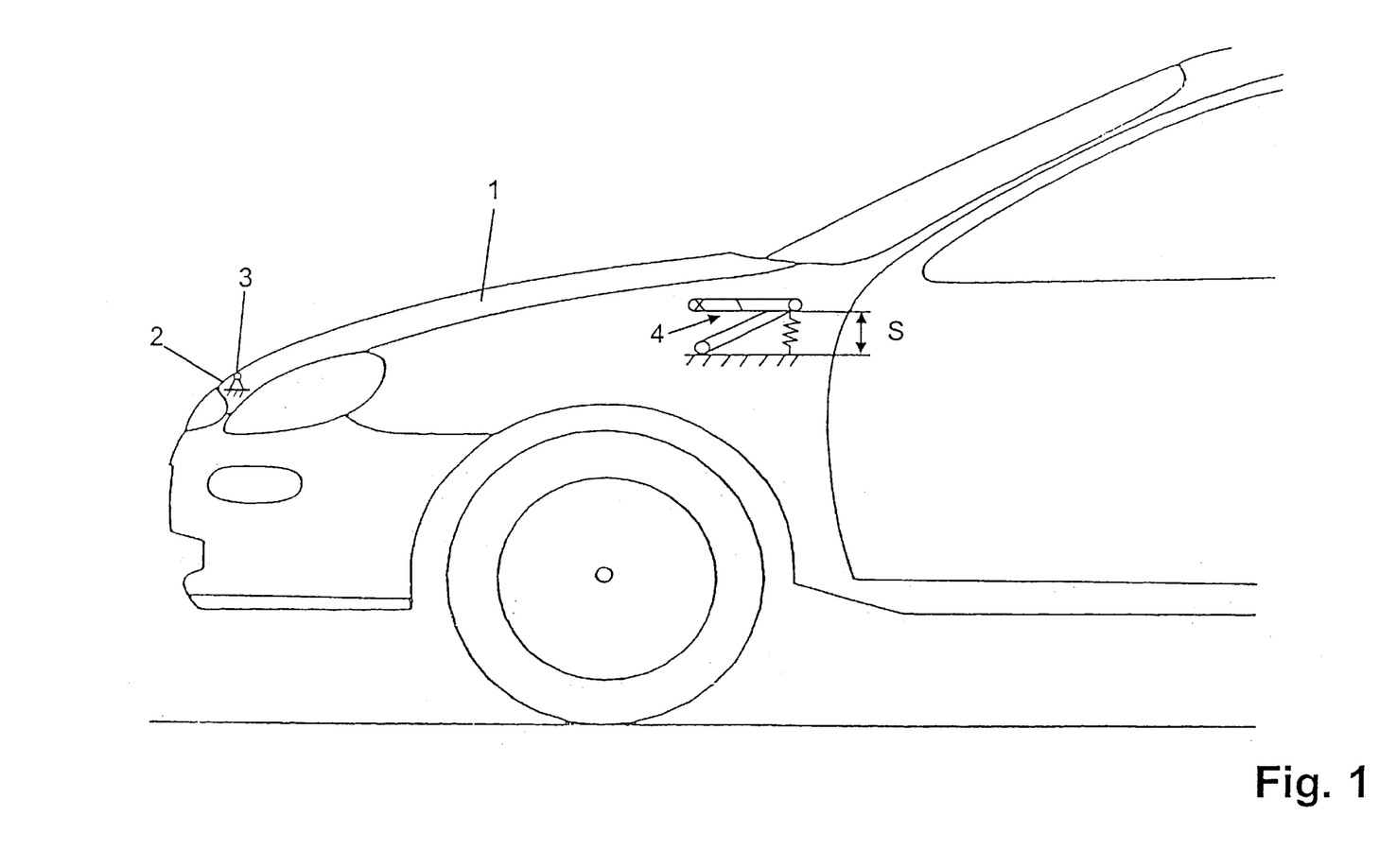
FIG. 1 diagrammatically depicts the front part of a motor vehicle with a first exemplary embodiment of a front-hood arrangement according to the invention.
Figure 2:
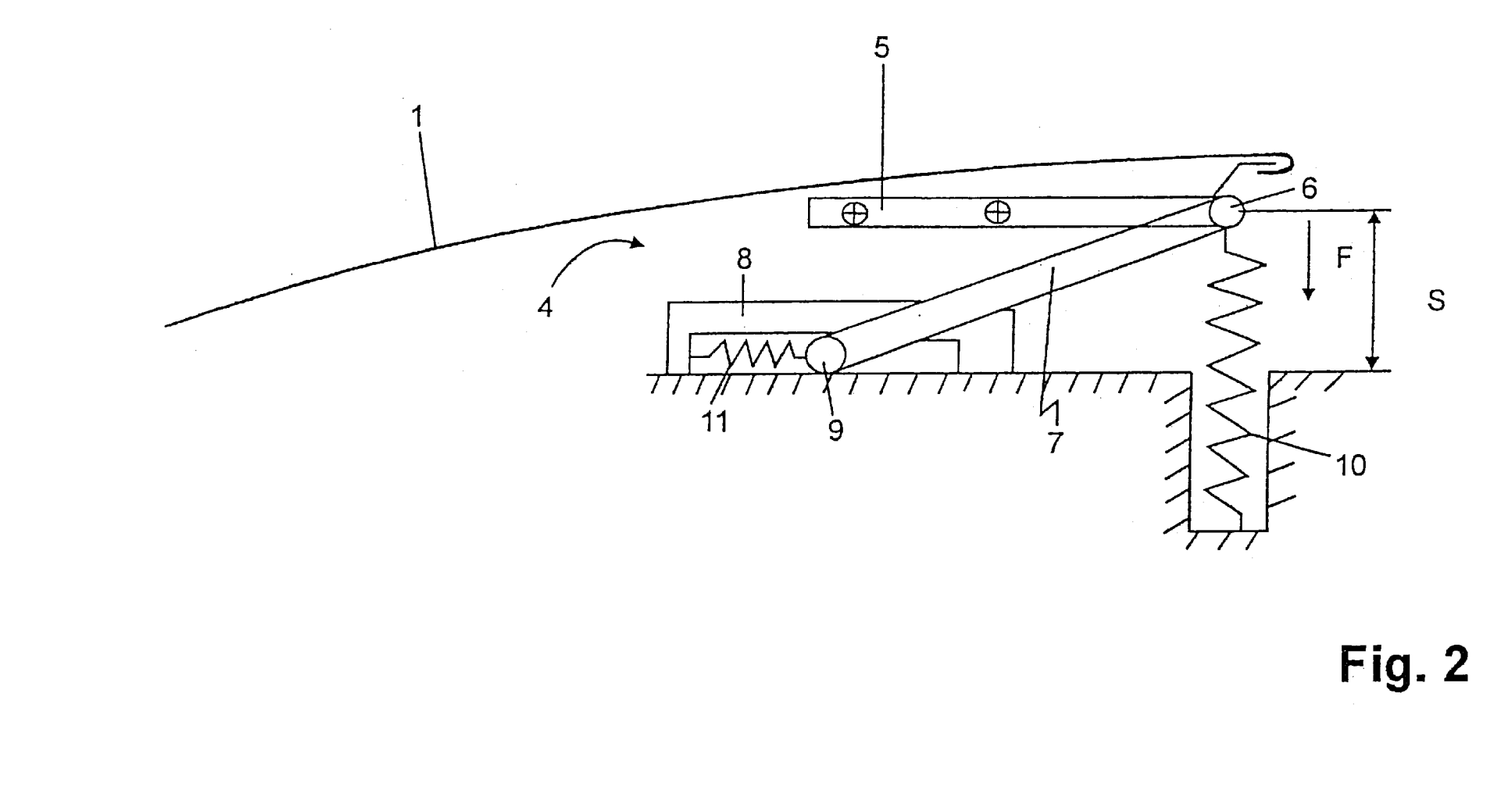
FIG. 2 shows a side view of the hinge of the front-hood arrangement shown in FIG. 1.

FIGS. 1 and 2 show a side view of the front part of a motor vehicle, the engine compartment of which can be closed off by a front hood 1. The front hood 1 is locked and unlocked by means of a hood lock 3 arranged in the front region 2 of the front hood and, on its side which faces the driver's compartment, is coupled at each edge side to the frame by means of one of two hinges 4. A joint 6 which is arranged on the end of a part 5 of the hinge 4 which is connected to the front hood 1 defines the pivot axis of the front hood 1 when the latter is opened after the hood lock 3 has been unlocked. It is possible to provide a pneumatic spring to assist the opening movement.

A joint head 7 is coupled to the joint 6, and the end 9 of this joint head which is remote from the joint 6 is accommodated in an axial bearing 8 which runs in the direction of travel and in which a spring 11 prestresses the link 7 in the at-rest position. The at-rest position of the joint 6 is also determined by a spring element 10 which prestresses the position of the joint 4 and therefore of the front hood 1 in an at-rest position, a travel-limiting means being provided for the spring element 10, preventing displacement beyond this position. In the event of an impact of a pedestrian, a force illustrated by arrow F acts substantially in a vertical component on the front hood 1, this force being significantly higher than the force of the weight of the front hood I which would otherwise have to be supported in the joint 6 when the front hood 1 is opened. If such a situation arises, it is very likely to be the impact of a pedestrian, the impact of which is to be damped by the resilient mounting of the hinge 4. In any case, the front hood 1 is pivoted about the hood lock 3, with the result that the link 7 is displaced in its axial bearing 8 and the spring 10 is stressed. S denotes the maximum travel by which the spring 10 can be stressed and by which the front hood 1 is lowered in the region of its hinges 4. The energy required to stress the spring 10 reduces the impact energy of the pedestrian on the front hood 1 accordingly and therefore reduces the extent of the injuries to the pedestrian.

Figure 3:
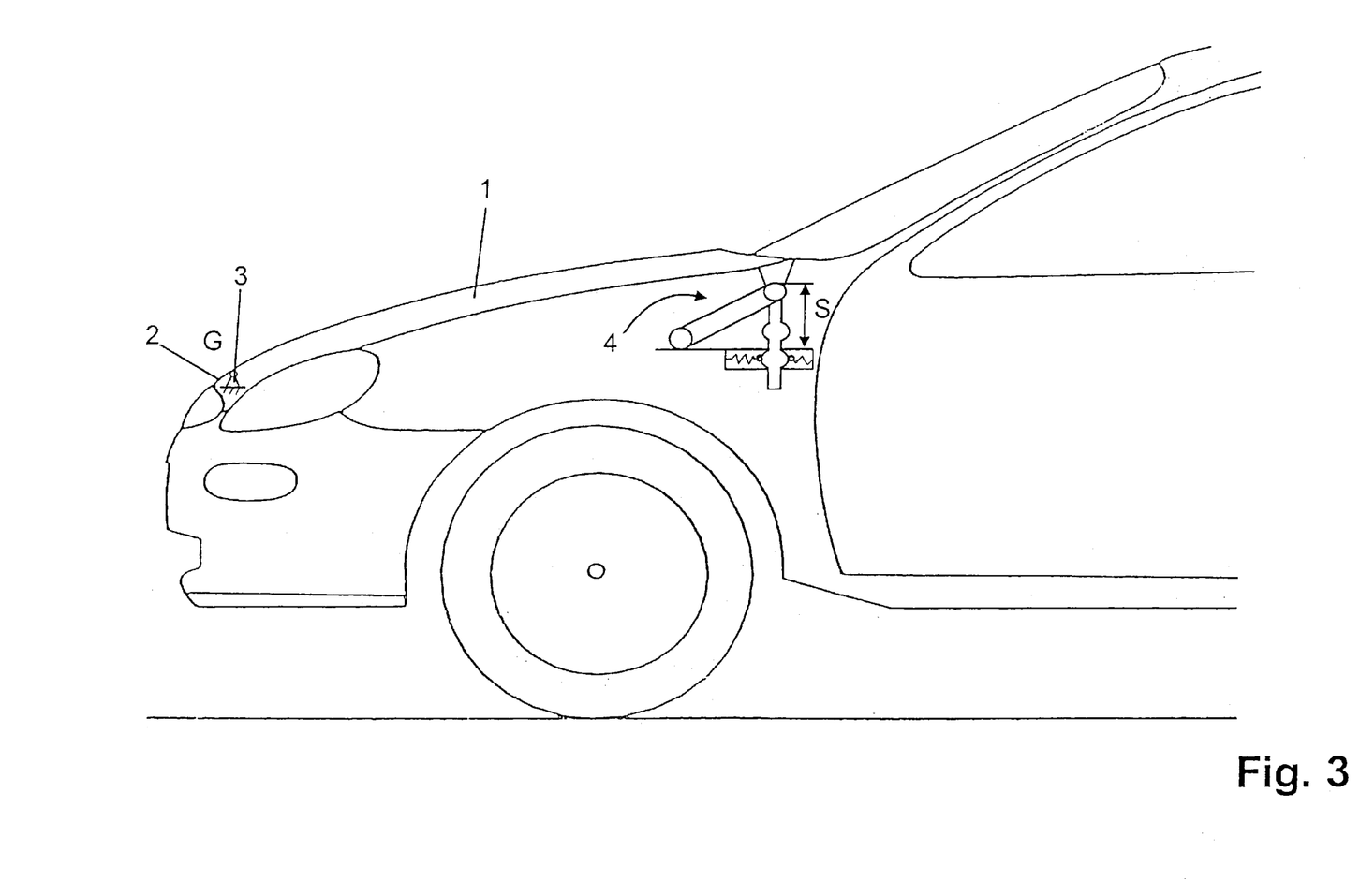
FIG. 3 diagrammatically depicts the front part of a motor vehicle with a second exemplary embodiment of a front-hood arrangement according to the invention.
Figure 4:
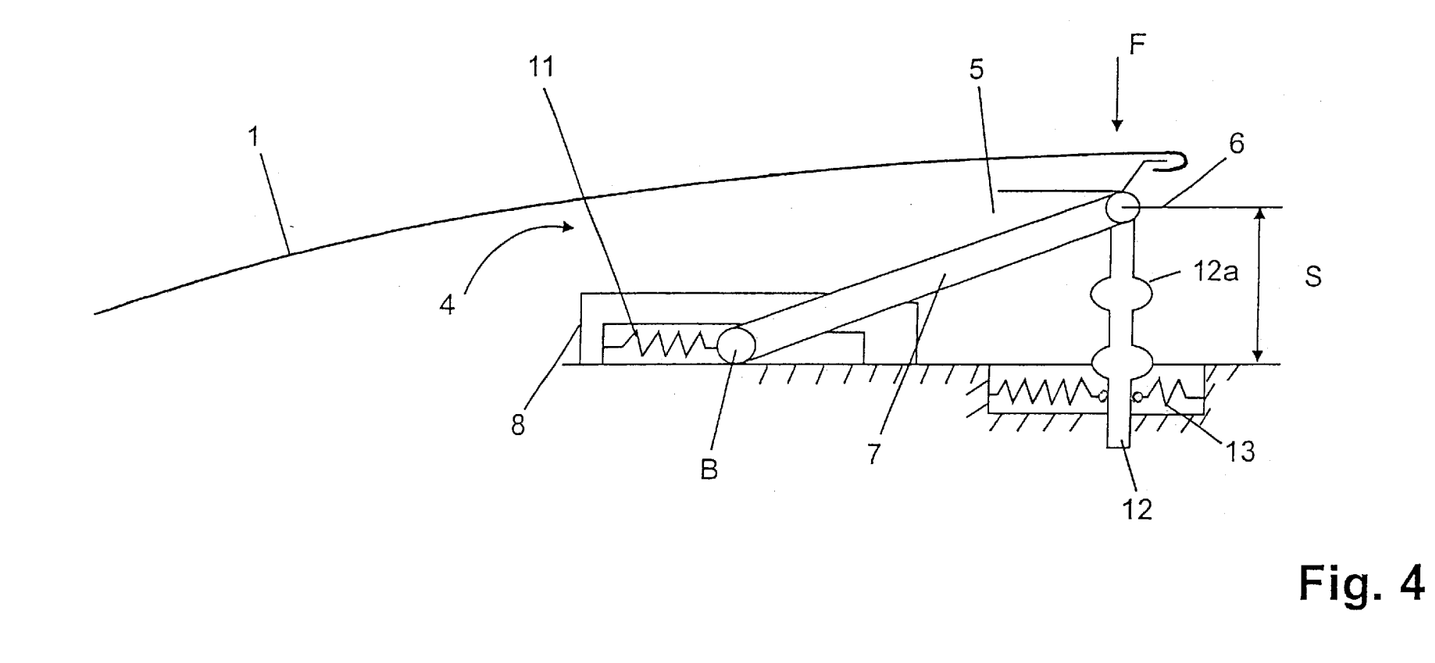
FIG. 4 shows a side view of the hinge of the front-hood arrangement shown in FIG. 3.

The exemplary embodiment illustrated in FIGS. 3 and 4 differs mainly through the nature of the stressing means, while the way in which it operates is otherwise similar to the previous exemplary embodiment, for which reason the same reference numerals as in the previous exemplary embodiment denote substantially the same parts.

Instead of a spring 10, a latch bar 12 is arranged on the joint 6, the downward displacement of which latch bar requires the application of energy in order to compress the spring elements 13 which radially surround the latch bar and are arranged substantially horizontally when a projection in the manner of a cam 12*a* is caused to move past the spring elements 13. The combination of the latch bar 12 with springs 13 acting perpendicular thereto means that it is possible for the force or energy required to be distributed in nonlinear fashion, for example by the diameters of the projecting cams 12*a* of the latch bar 12 increasing linearly or progressively, so that a greater force is accordingly required for each further latching, and consequently a greater amount of energy is converted into kinetic energy. When forming a latch bar, the fact that it is impossible for the latch bar 12 to spring back counter to the prestress of the springs 13 is particularly advantageous, with the result that, in addition to the springs 13 which convert the energy of the impact into stressing energy, no further holding means are required to prevent the front hood 1 from rebounding. The spring force of the springs 13 can easily be adjusted so that the minimum force required for the latching can be set to be considerably higher than the force of the weight of the front hood 1 while, at the same time, latching takes place even in response to the impact of small masses, as occur in the event of accidents with children at medium and low speeds. Also, inadvertent latching of the latch bar 12 and therefore lowering of the front hood 1 can easily be cancelled out again using the latch bar 12 by, for example, using a suitable tool to apply a suitable oppositely directed force in order to lift the front hood 1. It should be noted that the latch bar 12 may also have an end stop which limits its downward displacement, and it is also expedient to provide an end stop which limits the extent to which the latch bar can be pulled out when restoring the starting position.

A particular advantage of the stressing device produced by means of latch bar 12 is that the same latch bar can be used for different types of vehicles, for which the displacement distance S varies, simply by the latch bar 12 being pulled out to a correspondingly greater or lesser extent. Overall, a displacement travel S of the order of magnitude of 100 mm, preferably 120 mm, and if possible of at least 70 mm is expediently ensured.

A further particular advantage of the latch bar 12 described consists in the fact that, even if the load on the two hinges 4 is not uniform, the latching movement is insensitive to a horizontal component acting, for example, transversely with respect to the direction of travel and transversely with respect to the vertical, for example through tilting, since this is also absorbed by the springs 13. To this extent, an impact which is considerably eccentric and therefore exerts a greater load on one hinge 4 than the other can be successfully absorbed.

Figure 5:
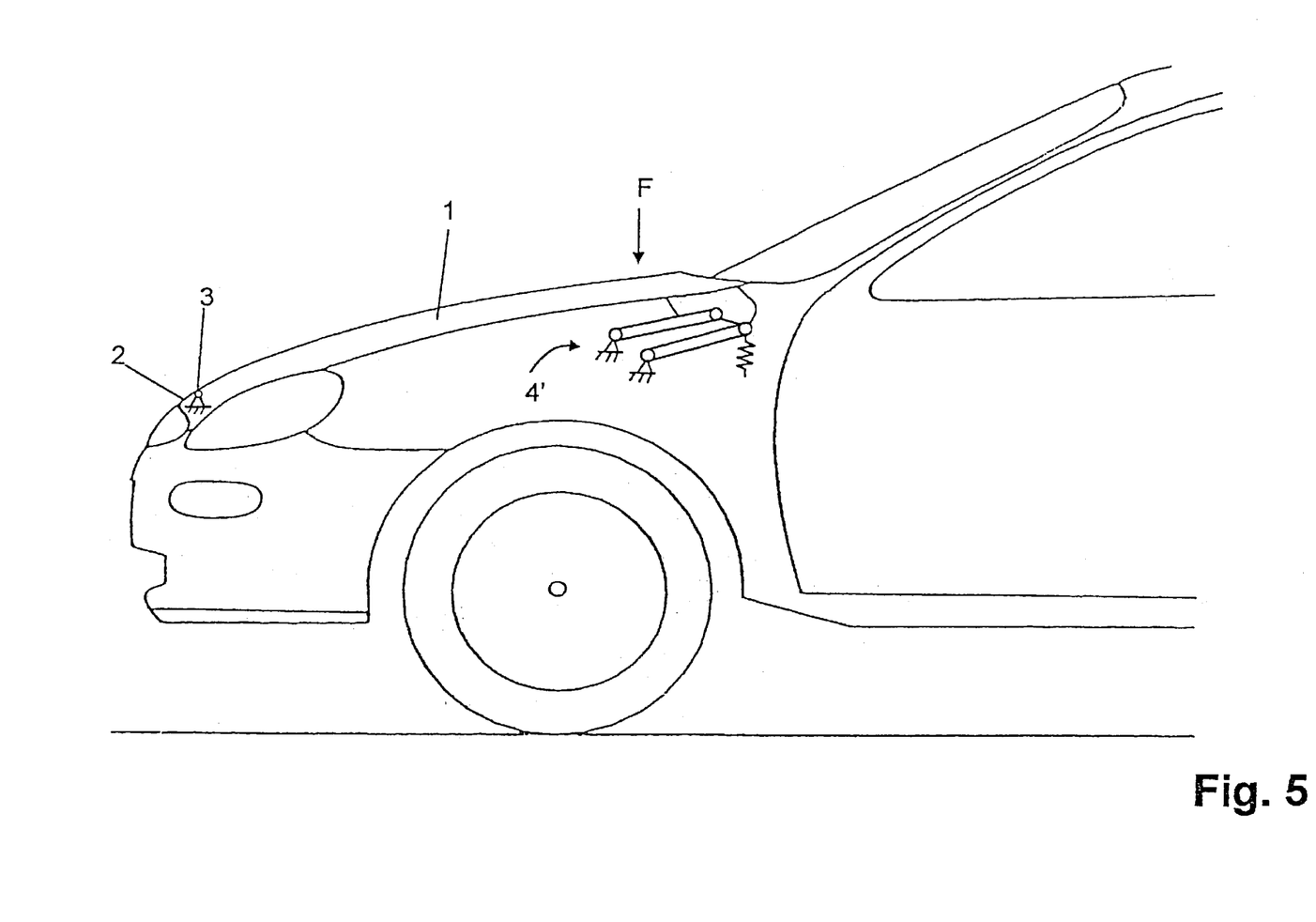
FIG. 5 diagrammatically depicts the front part of a motor vehicle with a third exemplary embodiment of a front-hood arrangement according to the invention.
Figure 6:
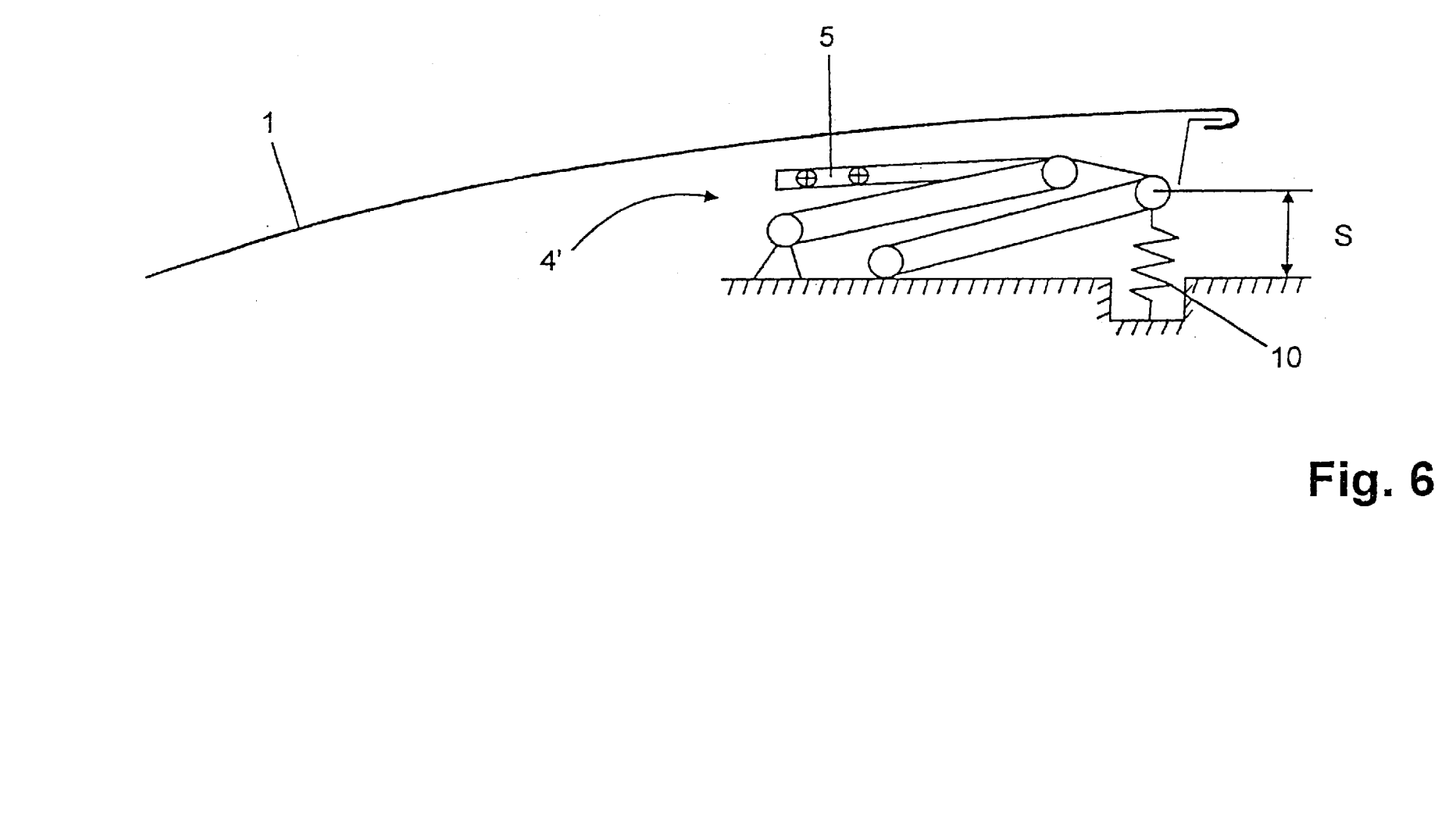
FIG. 6 shows a side view of the hinge of the front-hood arrangement from FIG. 5.

The exemplary embodiment illustrated in FIGS. 5 and 6 differs from that shown in FIGS. 1 and 2 substantially through the fact that, instead of a single-lever joint which is axially displaceable on the frame, a four-joint mechanism 4' is provided, although this is only diagranmatically indicated in these figures. It will be understood that, in this case, the parts 10, 12, 13 and 8, 9, 11 provided on the body in the above exemplary embodiments may accordingly be provided on one and/or the other link of the four-joint hinge, so that, for example, the corresponding bearings are provided on the same body part.

In the above text, the invention has been described as having stressing means which transmit the vertical component of the impact energy substantially in the vertical direction. It will, be understood that, as well as vertically arranged stressing elements, it is also possible to provide stressing elements which have only a vertical component and, in addition, a horizontal component.

In the description of the invention, it has been assumed that the front hood 1 is raised with respect to a position in which it would be possible for a pedestrian to hit solid components which lie beneath the front hood 1, which would be dangerous, and that some of the impact energy, when the front hood 1 is lowered, is converted into deformation energy or stress-relief energy of the stressing elements 10.

The invention has been described above with reference to various exemplary embodiments; it will be understood that the features of the various exemplary embodiments can be combined with one another to create further advantageous designs.

What is claimed is:

1. A front hood assembly for attachment to a vehicle, comprising
   a front hood;
   at least one hood lock for closing said front hood, and
   at least one hinge for coupling said front hood to a frame of said vehicle, said at least one hinge being of resilient design and comprising at least one joint,
   a stressing means for providing a vertical resistance, wherein said vertical resistance can be overcome, by a force pivoting said front hood about said hood lock, and
   a link that connects said at least one joint of said hinge to said frame, said link being displaceably arranged.
2. The front hood assembly as claimed in claim 1, wherein said hinge is a single-joint hinge.
3. The front hood assembly as claimed in claim 1, wherein said hinge is a four-joint hinge.
4. The front hood assembly as claimed in claim 2, wherein a link of said four-joint hinge is displaceable with respect to said frame.
5. The front hood assembly as claimed in claim 1, wherein said link is prestressed by spring force in a bearing.
6. The front hood assembly as claimed in claim 1, wherein said stressing means comprises a compressible spring.
7. The front hood assembly as claimed in claim 1, wherein said stressing means comprises a vertically arranged latch bar, vertical displacement of which is decelerated by horizontally arranged spring elements.
8. The front hood assembly as claimed in claim 1, wherein said force comprises a first force against the front hood and said stressing means by provides a second force in the opposite direction of said first force.
9. The front hood assembly as claimed in claim 1, wherein said hinge, when, in a non-deflected position, is of resilient design.
10. A motor vehicle, comprising
    a frame,
    a front hood coupled to said frame of the vehicle via at least one hinge, and
    a hood lock for closing said front hood,
    wherein said at least one hinge is of resilient design and comprises a stressing means for providing a vertical resistance, wherein said vertical resistance can be overcome by a force against said front hood, said force comprising a vertical force component,
    at least one link connecting a joint of said hinge to said frame, and
    wherein said at least one link is arranged in a displaceable manner relative to said frame.
11. The motor vehicle as claimed in claim 10, wherein said stressing means comprises a spring.
12. The motor vehicle as claimed in claim 10, wherein said stressing means comprises a latch bar substantially arranged vertically and a spring urging against said latch bar,
    such that when said front hood and said latch bar are displaced downwardly, said spring is compressed and provides a resistance against the downward direction of displacement.
13. The motor vehicle as claimed in claim 10, wherein said hinge is a four-joint hinge comprising a first link and a second link,
    wherein each of said first link and said second link comprises a front-hood joint and a frame joint,
    wherein said stressing means comprises a spring urging against at least one of said front-hood joints, and
    wherein said frame joint of the link coupled to said one of said front-hood joints is displaceably connected to said frame.
14. The motor vehicle as claimed in claim 10, wherein said front hood is, in a non-deflected position, disposed in an elevated position with respect to an overload position,
    such that, in the event of a pedestrian impact, said front hood is already in a position enabling said front hood to damp the impact.

* * * * *